G. W. & G. H. Simmons.
Liquor Pourer,
Nº 24,083. Patented May 17, 1859.
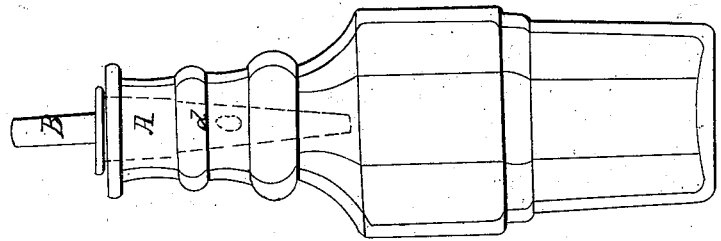
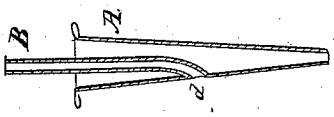
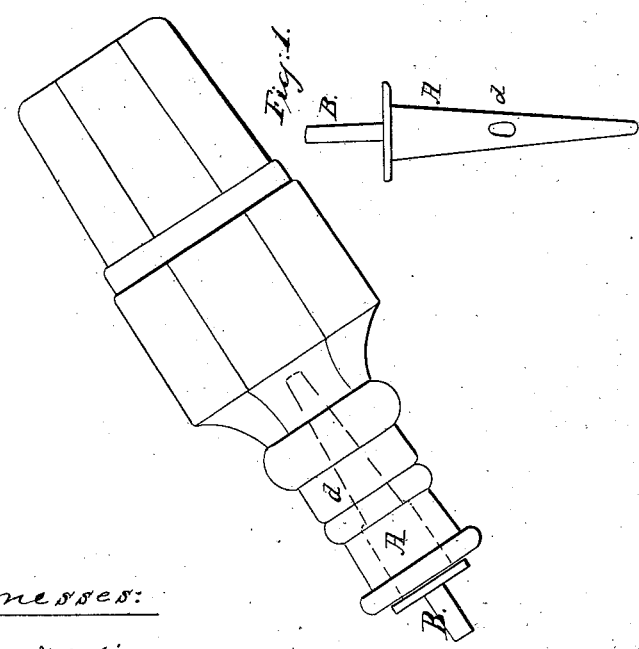
Witnesses:
John Hastings
Ruth W. Hastings
Inventor:
George W. Simmons
George H. Simmons

UNITED STATES PATENT OFFICE.

GEO. W. SIMMONS AND GEO. H. SIMMONS, OF NORTH BENNINGTON, ASSIGNORS TO THEMSELVES AND NORMAN MILLINGTON, OF SHAFTSBURG, VERMONT.

IMPROVED VINEGAR CRUET OR BOTTLE.

Specification forming part of Letters Patent No. 24,083, dated May 17, 1859.

*To all whom it may concern:*

Be it known that we, GEORGE W. SIMMONS and GEORGE H. SIMMONS, of Bennington, in the county of Bennington and State of Vermont, have invented a new and improved method of drawing vinegar and other liquids from cruets and other vessels in diminutive streams, which we hereby name "The Improved Liquid-Pourer;" and we do hereby declare that the following is a full and exact description thereof, reference being had to the accompanying drawings, and to the letters of reference marked thereon, the same or like letters indicating the same part.

Our invention consists in a new article of manufacture designed for the table, or for culinary or household purposes, and to be used in connection with bottles, cruets, or other vessels for holding liquids, and is composed of a conical tube having within it another tube, through which latter the liquid flows from the interior of the vessel, while the outer tube furnishes a supply of air to the interior of the vessel to cause the liquid to flow freely by its own gravity.

To enable others to make and use our said invention, we proceed to give a more particular description of its construction and operation, by reference to the accompanying drawings, which are made a part of this specification, viz:

Figure 1 represents the conical air-tube A, a part of the liquid-tube B, and the aperture through which the liquid passes into the tube B; Fig. 2, a vertical section showing the internal construction and arrangement of the tubes A and B, and position of the aperture $d$; Fig. 3, a vertical section of a glass vessel with a glass tube fitted in; Fig. 4, a sketch of a cruet and tubes at an angle to discharge liquids.

A is the conical air-tube, made of any suitable material, about two inches long, and three-eighths of an inch at the largest end, and one-eighth of an inch diameter at the small end or point, or of any other desirable dimensions. The large end may be encircled with a flange or collar, and serves to catch and return all drainage back into the vessel. The object of this tube, when raised to a proper angle, is to conduct the air into the vessel above the aperture $d$, so that the liquid by its own gravity will pass out through the liquid-tube B.

$d$ is the aperture or the end of the liquid-tube B, about one-eighth of an inch diameter, or any desirable size, and may be placed at any point in the air-tube which may be reached by the liquid in the vessel, or near its middle.

B is the liquid-tube, about one-eighth of an inch diameter, and of suitable length, is firmly joined on the inside to the aperture $d$, (see Fig. 2,) through which the liquid is drawn from the vessel when the tubes are brought to a proper angle.

Operation: The tubes being constructed and arranged as described and illustrated in the specification and drawings, are made air-tight by cork or otherwise in the orifice of the vessel, and though full the liquid will not run out till the point of the tube A is raised above the level of the aperture $d$, when the air passes in through the air-tube and rises to the surface in bubbles, and the liquid, being thus restored to its natural gravity, flows freely from the liquid-tube B.

This apparatus, when made of glass, is peculiarly adapted to the use of vinegar and acid condiments for the table.

What we claim as our invention, and desire to secure by Letters Patent, is—

As a new article of manufacture, a bottle, cruet, or other similar vessel for containing liquids for table, culinary, or household purposes, provided with the tubes A and B, made and fitted to them in the manner and for the purposes herein described and represented.

GEORGE W. SIMMONS. [L. S.]
GEORGE H. SIMMONS. [L. S.]

Witnesses:
JOHN HASTINGS,
J. C. HOUGHTON.